United States Patent Office 3,630,977
Patented Dec. 28, 1971

3,630,977
WATER-DILUTABLE PHENOPLASTS HAVING CARBOXYL GROUPS
Bernhard Broecker and Hans-Joachim Kiessling, Hamburg, Germany, assignors to Reichhold-Albert-Chemie Aktiengesellschaft, Hamburg, Germany
No Drawing. Filed Dec. 2, 1968, Ser. No. 780,583
Claims priority, application Germany, Dec. 8, 1967, P 17 45 353.1
Int. Cl. G08g 37/08
U.S. Cl. 260—19             14 Claims

ABSTRACT OF THE DISCLOSURE

Amine salts of phenoplasts carrying carboxylic groups prepared by:
(a) etherifying heat-curable phenol-aldehyde condensation products, such as mononuclear and polynuclear phenols condensed with aldehydes and partially etherified with lower monohydric aliphatic alcohols having 1 to 4 C-atoms, by warming with aliphatic mono- or dihydroxy carboxylic acids having 2 to 20 C-atoms or their esters with alcohols having 1 to 6 C-atoms;
(b) saponifying the condensates having ester groupings in an alkaline medium;
(c) separating the etherified phenolic resin-carboxylic acid; and
(d) mixing the separated phenolic resin-carboxylic acid with ammonia and/or strong organic nitrogen bases.

CROSS-REFERENCES TO RELATED APPLICATIONS

Applicants incorporate by reference the disclosure of the copending application of Wilhelm Becker, Ser. No. 776,825 (now abandoned) entitled "Water-Soluble Synthetic Resins Containing Urethane Groups," filed in the U.S. Patent Office on Nov. 18, 1968.

BACKGROUND OF THE INVENTION

The field of the invention is coating compositions containing fat, fatty oil acid or salts thereof.

The present invention is particularly concerned with the manufacture of water-soluble synthetic resins based on phenoplasts possessing carboxyl groups.

Previous products based on phenoplasts suffer from the great disadvantage that they are not storage-stable in aqueous solution. The pH value of the neutralized products slides into the acid range on storage, as a result of which water-insoluble constituents are formed.

The state of the prior art is set forth in Kirk-Othmer "Encyclopedia of Chemical Technology," 2nd ed., vol. 8 (1965), in the section entitled "Electrophoretic Deposition," pages 23–36; vol. 8 (1965), in the section entitled "Epoxy Resins," pages 294–312, particularly pages 304–309 which disclose epoxy esters and their utility in protective coatings; vol. 15 (1968), in the section entitled "Phenolic Ethers," pages 165–175, particularly page 173 where polyhydroxy ethers are disclosed; and vol. 15 (1968), in the section entitled "Phenolic Resins," pages 176–207.

The state of the prior art is further set forth in German published specification 1,113,775; Belgian Pats. 538,054 and 537,055; Austrian Pat. 180,407; French Pat. 1,544,-219; U.S. patent application Ser. No. 668,695 (now abandoned); French Pat. 1,497,222; German Pat. 1,073,665; U.S. patent application Ser. No. 728,920 (now abandoned); and German printed patent applications 17 45 352.0 and 17 45 351.9.

German published specification 1,113,775 describes a process for the manufacture of essentially neutral aqueous stoving lacquers of:
(I) Water-soluble phenolic resins;
(II) Polyesters which act as plasticizers, having an acid number of above about 35, preferably 50 to 70, and numerous hydrophilic groups, which at least predominantly consist of preferably primary hydroxyl groups;
(III) A strong water-soluble inorganic or organic nitrogen base; and
(IV) Water or a mixture of water and solvents miscible therewith, wherein a resol carboxylic acid which is relatively low molecular is used as component I this being a (poly) methylol compound of a phenolcarboxylic acid which has an acid number of about 100 to 250 and in which the total number of all nuclear hydrogen atoms which are in the o- or p-position to all the free phenolhydroxyl groups does not significantly differ from two, and that the plasticizing polyester resin (component II) has one gram hydroxyl group per 200 to 400 g. of the resin. The resol carboxylic acid employed in this known process is bonded to the carboxylic acid group in an etherlike manner via the phenolic hydroxyl group, and this significantly lowers the reactivity of the resol carboxylic acid.

Belgian Pats. 538,054 and 537,055 disclose phenolic resins soluble in an alkaline medium in which the phenyl nuclei of 4,4-bis(4-hydroxyphenol)-valeric acid are substituted by aliphatic groups which have been obtained by reaction with formaldehyde. These known water-soluble binders, however, suffer from the disadvantage that they cannot be used as binders alone since they are not sufficiently plasticized.

SUMMARY OF THE INVENTION

An object of the present invention is a process for the manufacture of ammonia and/or amine salts of phenoplasts possessing carboxyl groups, these salts being capable of dilution with water and not possessing the disadvantages of the prior art, wherein heat-curable phenolaldehyde condensation products are etherified by warming with aliphatic hydroxycarboxylic acids, preferably hydroxycarboxylic acid esters, the condensates possessing ester grouping are saponified in an alkaline medium and the phenolic resin-carboxylic acid is isolated therefrom according to methods which are in themselves known, and is mixed with ammonia and/or strong organic nitrogen bases until it reaches the desired ability to be diluted with water.

Other objects of the present invention are the new synthetic resins, capable of dilution with water, as such, as obtained according to the process.

Another object of the invention is the use of the new phenolic resin-carboxylic acids as binders alone or as binders together with other synthetic resins in pigmented or unpigmented aqueous lacquers or coating compositions for the electrophoretic application process, wherein the electrophoretically deposited films are stoved at an elevated temperature.

A further object of the invention is the use of the new phenolic resin-carboxylic acids as binders alone or as binders together with other binders in pigmented or unpigmented aqueous lacquers or coating compositions for the manufacture of coatings which are stoved at elevated temperature.

The products according to the invention have unlimited storage stability in a neutral and alkaline medium, especially in the presence of water.

By heat-curable phenol-aldehyde condensation products there are also to be understood condensation products which when heated alone, while reaching a relatively high molecular state, do not yet reach an infusible state.

Examples of suitable heat-curable hydrophilic low molecular phenol-aldehyde condensation products are phenol-alcohols and phenol-polyalcohols, that is to say, products which are still low molecular and which are obtained by condensation of mononuclear and/or polynuclear phenols with aldehydes such as formaldehyde, acetaldehyde, crotonaldehyde, acrolein, benzaldehyde, furfurol and the like, or compounds which yield formaldehyde such as paraformaldehyde, paraldehyde or trioxymethylene. The preferred aldehyde is formaldehyde or a compound which yields formaldehyde which is obtained in an alkaline medium in a known manner, such as for example, hexamethylene tetramine. Suitable phenols are phenol, and phenols which are substituted in the o,o',p-position but can still be condensed with formaldehyde, such as cresol and xylenol. Particularly suitable compounds are resols which are obtained from alkylphenols such as propylphenol, butylphenol and especially p-tert.-butylphenol. Resols of binuclear phenols such as diphenol and Bisphenol A are furthermore suitable, especially if about 1.75 to 2.5 moles of formaldehyde have been added on per mole of phenol. When using the resols, it is advisable conjointly to use a small quantity of a strongly hydrophilic solvent such as ethylglycol, diethylglycol, propylglycol, isopropylglycol and btuylglycol. It is essential for at least a part of the phenol-aldehyde condensation products to be etherified with lower monohydric aliphatic alcohols having 1 to 4 C-atoms such as methanol, ethanol, propanols or butanols.

The molar ratio of aldehydes to mononuclear phenols is suitably about 1:1 to 1:3 preferably 1.15 to 1:2.5.

The molar ratio of aldehydes to di-nuclear phenols is suitably about 1:1 to 1:4 and preferably 1:2 to 1:4.

Specific examples of the phenol-aldehyde condensation products are the reaction products of: p-tert-butylphenol and formaldehyde, Bisphenol A and formaldehyde, phenol and formaldehyde, xylene and formaldehyde, propylphenol and formaldehyde, 4,4 - bis(4 - hydroxyphenol)-valeric acid and formaldehyde.

The phenol-aldehyde condensation products are etherified with lower monohydric aliphatic alcohols having 1 to 4 C-atoms, suitably between about 10 to 50 weight percent, and preferably between about 20 to 40 weight percent.

Specific examples of the phenol-aldehyde condensation products etherified with monohydric aliphatic alcohols are the reaction products of: p - tert. - butylphenol, formaldehyde and methanol; p-tert. - butylphenol, formaldehyde and n-butanol; Bisphenol A, formaldehyde and n-butanol; Bisphenol A, formaldehyde and methanol; 4,4 - bis(-4 - hydroxyphenol) - valeric acid formaldehyde and methanol; 4,4 - bis( - 4 - hydroxyphenol)-valeric acid formaldehyde and butanol, xylene formaldehyde and butanol wherein the mononuclear and polynuclear phenols have 6 to 17 carbon atoms.

Suitable aliphatic monohydroxycarboxylic and/or dihydroxycarboxylic acids having 2 to 20 C-atoms are, for example, products such as glycollic acid, lactic acid, dimethylol-propionic acid, ricinoleic acid, hydroxystearic acid and similar aliphatic monohydroxycarboxylic acids havng 10 to 20 C-atoms. These hydroxycarboxylic acids are preferably employed as esters with alcohols having 1 to 6 C-atoms, such as methanol, ethanol, propanols, butanols, pentanols and hexanols.

The most preferred embodiment of the present invention comprises the etherification of the heat-curable phenol-aldehyde condensation products with ricinoleic acid or ricinoleic acid esters or hydroxystearic acid and similar monohydroxycarboxylic acids having 10 to 20 C-atoms, or their esters.

In a preferred embodiment, the ricinoleic acid or the ricinoleic acid esters and/or hydroxystearic acid and/or the monohydroxycarboxylic acids having 10 to 20 C-atoms or their esters may be replaced to the extent of up to 20% by weight of glycollic acid, lactic acid and/or dimethylolpropionic acid or their esters.

The present embodiments are distinguished by the resulting phenolic resin-carboxylic acids being well plasticized.

Plasticized phenolic resin-carboxylic acids may, however, also be obtained when using glycollic acid, lactic acid, dimethylolpropionic acid or their esters by reaction with the heat-curable phenol-aldehyde condensation products, when these are etherified with long chain saturated and/or unsaturated monohydric alcohols having 6 to 30 C-atoms, preferably 10 to 20 C-atoms.

The phenol-aldehyde condensation products etherified with lower monohydric aliphatic alcohols are suitably etherified with mono- or dihydroxy carboxylic acids or their esters between about 10 to 50 weight percent and preferably between about 10 to 30 weight percent.

Specific examples of the partially etherified phenol-aldehyde condensation products that are etherified with mono- or dihydroxy carboxylic acids or their esters are the reaction products of: p-tert.-butylphenol, formaldehyde, methanol and ricinoleic acid methyl ester; p-tert.-butylphenol, formaldehyde, n-butanol and ricinoleic acid methyl ester; Bisphenol A, formaldehyde, n-butanol and ricinoleic acid methyl ester; p-tert-butylphenol, formaldehyde, butanol and dimethylolpropionic acid p-tert-butylphenol, formaldehyde, butanol and lactic acid methyl ester; p-tert-butylphenol, formaldehyde, butanol and glycollic acid butylester.

The quantity ratio of the alkylated phenolaldehyde condensation product to the hydroxycarboxylic acid or its esters is so chosen in the reaction that the resulting end product shows an acid number or a saponification number of between 30 and 150, preferably between 30 and 80. This is achieved by continuing the trans-etherification of the heat-curable phenol resol with the hydroxycarboxylic acid or its esters, or their mixtures, by heating until the etherified condensate has reached an appropriate acid number or saponfication number. The trans-etherification of the phenol resol which has been etherified with volatile monoalcohols with the hydroxycarboxylic acid or its esters takes place by carrying out the trans-etherification with the addition of acid caalysts and with warming. The etherification alcohol which is split off at the same time is removed by distillation, preferably in vacuo. The reaction is continued until the desired amount of alcohol has been removed by distillation.

As catalysts, acids or compounds which split off acid are preferably used which are in themselves known as trans-etherification catalysts, for example, phosphoric acid, sulphuric acid, boron trifluoride adducts and p-toluenesulphonic acid.

If hydroxycarboxylic acid esters have been used in the trans-etherification, then these must be saponified after the manufacture of the etherified condensate. This is done by adding aqueous or alcoholic solutions of inorganic strong bases such as sodium hydroxide solution, potassium hydroxide solution, calcium hydroxide or barium hydroxide. After the saponification the resin-carboxylic acid is liberated by adding acid and the salts thereby produced must be removed. This is preferably done by washing the resin-carboxylic acid with water. The further development of the process has the characteristic that the resulting trans-etherification product is, after saponification in an aqueous alkaline medium;

(a) Subjected to an azeotropic distillation in order to separate off the water and that subsequently the azeotropic entraining agent is removed in vacuo by heating;

(b) That the distillation residue is converted to the free resin-carboxylic acid by adding acids which are optionally dissolved in organic solvents, and that herein the acid is added in such amounts that it largely neutralizes the alkali but that this acid is not present in excess over the total alkali content;

(c) That the resulting salt is separated off; and (d) That the resin-carboxylic acid is converted into water-soluble products by adding ammonia and/or strong organic bases.

The azeotropic distillation is carried out according to methods which are in themselves known in order to remove the water from the mixture consisting of reaction products following the saponification, and of excess alkaline reagent. Possible azeotropic entraining agents are, for example, benzene, toluene and xylene.

After conclusion of the azeotropic distillation, the residue is freed of azeotropic entraining agent by heating to temperatures of 80–150° C., preferably 80–100° C., and applying a vacuum of, for example, 12 mm. mercury column.

The distillation residue thus obtained, which consists of the alkali salts of the phenolic resin-carboxylic acid and excess alkali, is mixed with acids in order to obtain the free phenolic resin-carboxylic acid. Here it is particularly important that the acid should be added in such amounts that it largely neutralizes the alkali, but so that this acid is not present in excess over the total alkali content. This excess of acid must obviously be avoided in order to avoid disturbances during the electrophoretic application process. The following are, for example, suitable organic acids for this purpose: formic acid, acetic acid, propionic acid, oxalic acid, malonic acid and succinic acid, and oxalic acid is preferred. Hydrogen chloride, phosphoric acid and sulphuric acid can, for example, be used as inorganic acids.

These acids are optionally used dissolved in organic solvents, and for this purpose the following are, for example, suitable as organic solvents: ketones such as acetone, methyl ethyl ketone and methyl isobutyl ketone, alcohols such as methanol, ethanol and propanol, glycols such as ethylene glycol, propylene glycol, ethyl glycol, propyl glycol or butyl glycol, acetone being preferred.

After the addition of the acid, the mix must be well stirred in order for the reaction of the added acid with the salts of the resin-carboxylic acids and the excess alkali to take place completely. It is sufficient to work at room temperature, but it is also possible to accelerate the reaction by slight warming, though the temperature must not be chosen to be so high that undesired reactions are initiated. After the reaction is ended, the resulting salt must be separated off by filtering or centrifuging.

The electrolyte-free phenolic resin-carboxylic acids are then converted to their salts by adding ammonia and/or strong organic bases such as, for example, trimethylamine, triethanolamine, triisopropanolamine, diglycolamine, diethylamine, piperidine, pyridine, morpholine, diethanolamine, N-dimethylethanolamine and N-methylethanolamine.

By strong organic bases there are here to be understood secondary or tertiary amines which in 50% strength strength aqueous solution reach a pH value of at least 9. It is here not necessary completely to neutralize the carboxyl groups of the phenolic resin-carboxylic acid; instead it suffices to add such an amount of ammonia and/or amine that the products are at least capable of dilution with water.

In selecting the aliphatic hydroxycarboxylic acids or their esters, the use of ricinoleic acid, hydroxystearic acid and similar monohydroxycarboxylic acids having 10 to 20 C-atoms or their esters is particularly advantageous since the resulting phenolic resin-carboxylic acids are internally plasticized by the ricinoleic acid groups or by other monohydroxycarboxylic acids having 10 to 20 C-atoms. When using other short chain aliphatic hydrocarboxylic acids having 2 to 6 C-atoms, it is advisable conjointly to use plasticizing components. For this purpose the use of alcohols having 10 to 20 C-atoms such as, for example, lauryl alcohol, myristyl alcohol, palmityl alcohol, stearyl alcohol, linseed oil alcohol or soya oil alcohol is particularly suitable. Monohydric alcohols having 6 to 30 C-atoms, preferably 10 to 20 C-atoms, can either be introduced into the etherified phenolic resin together with the aliphatic hydroxycarboxylic acids by transetherification, or they can be incorporated into the resin at the same time as the etherification of the phenolic resin. The quantity ratio of these alcohols to the etherified phenolic resins depends on the desired elastic properties of the end product.

The new phenolic resin-carboxylic acids, capable of dilution with water, which are obtained according to the process of the invention, may be used as sole binders in aqueous coating materials. Mixtures of the new phenolic resin-carboxylic acid resins, capable of dilution with water, with other resins capable of dilution with water, are also possible. It is particularly noteworthy that the new phenolic resin-carboxylic acids capable of dilution with water possess a hitherto unknown storage stability even in aqueous alkaline solution.

The phenolic resin-carboxylic acids which are obtained according to the process of the invention, are also suitable for electrophoretic deposition. Here the products which are internally plasticized with ricinoleic acid are particularly suitable since relatively elastic coatings are thereby produced. If resin-carboxylic acids which are particularly highly plasticized are needed, then resin-carboxylic acids are preferred which alongside the ricinoleic acid contain the monohydric alcohols with 6–30 C-atoms, which have already been mentioned, bonded in an ether-like manner. If the products are to be used for electrophoretic coating, the viscosity of the products should be between 95 and 235 cp., measured at 25° C., 1:1 in butyl glycol. The pH value of the aqueous solution should be between 7 and 9, preferably between 7 and 8. It is advisable conjointly to use a small quantity of a hydrophilic solvent such as ethyl glycol, diethyl glycol, propyl glycol, isopropyl glycol or butyl glycol.

When using the products manufactured according to the invention for conventionally applied aqueous lacquers, the viscosity range is not so decisive since the processing viscosity of the solvent additive can be adjusted.

Preferred embodiments of the present invention consist of reaction products of the following constitution:

A p-tert.-butylphenol resol which contains 1 mole of glycollic acid and 1 mole of linseed oil fatty alcohol per mole of phenol. The acid number is 100–105 and the viscosity preferably 95–235 cp. (1:1 in butyl glycol, 20° C.).

The same product, synthesized with soya oil fatty alcohol instead of linseed oil fatty alcohol.

The same product synthesized with stearyl alcohol instead of soya fatty alcohol.

The preceding products synthesized with lactic acid instead of glycollic acid.

Reaction product of 1 mole of p-tert.-butylphenol resol which per mole of phenol contains 1 mole of glycollic acid and 1 mole of lauryl alcohol. The product has an acid number of 120 and a preferred viscosity of between 95 and 235 cp. (1:1 in butyl glycol, 20° C.).

A Bisphenol-A-resol having a formaldehyde loading of about 2, which per mole of phenol contains 1 mole of glycollic acid and 1 mole of soya oil fatty alcohol bonded in an ether-like manner. The acid number of the product is about 90. The preferred viscosity is between 95 and 235 cp. (1:1 in butyl glycol, 20° C.).

The same product synthesized with linseed oil alcohol instead of soya oil alcohol.

The same products synthesized with lactic acid instead of glycollic acid.

A phenol resol based on Bisphenol A having a formaldehyde loading of about 3.5–3.8 and containing, per mole of resol, 1 mole of glycollic acid and 1 mole of linseed oil fatty alcohol bonded in an ether-like manner, with the remaining methylol groups being at least partially etherified with butanol. The acid number is 70–80 and the preferred viscosity 95–235 cp. (1:1 in butyl glycol at 20° C.).

The same product as above but synthesized with 2 moles of linseed oil fatty alcohol and 1 mole of glycollic acid per mole of resol instead of 1 mole of linseed oil fatty alcohol. The product has an acid number of 50–60 and a preferred viscosity of 95 to 230 cp. (1:1 in butyl glycol, measured at 20° C.).

The same products synthesized with soya oil fatty alcohol instead of linseed oil fatty alcohol.

DESCRIPTION OF CARRYING OUT THE PREFERRED EMBODIMENTS

Without further elaboration, it is believed that one skilled in the art can, using the preceding description, utilize the present invention to its fullest extent. The following preferred specific embodiments are, therefore, to be construed as merely illustrative, and not limitative of the remainder of the specification and claims in any way whatsoever.

Manufacturing instructions for heat-curable etherified phenol-formaldehyde condensation products

Etherified Phenol Resol 1

500 g. of p-tert.-butyl phenol resol are mixed with such quantities of methanol that the water content of the reaction mixture is not more than 20% by weight, relative to methanol. The mixture is then adjusted to a pH value of 1 with concentrated hydrochloric acid and warmed to 60° C. for 2 to 3 hours. The solids content of a neutralized sample rises by about 2–3%. Thereafter the methanol is distilled off in vacuo, in the course of which a temperature of 60° C. should not be exceeded. The reaction mixture is twice washed with water in order to remove the excess acid. Thereafter the mixture is concentrated in vacuo up to an internal temperature of 100° C. The solids content of the etherified resol is 92%.

The butyl phenol resol employed was manufactured as follows: 60 g. of p-tert.-butyl phenol and 80 g .of 30% strength aqueous formaldehyde solution are allowed to react with one another under the influence of strong caustic alkalis in a known manner at 40° C. until the free formaldehyde content has fallen to almost zero. The resol is decomposed with the aid of strong acids and washed with water until free of salts.

Etherified Phenol Resol 2

686.5 g. of p-tert.-butyl phenol resol are dehydrated in vacuo up to 90° C., and
1650 g. of n-butanol, and
835 g. of toluene are then added.

The mixture is heated to boiling and the water removed by azeotropic distillation, in the course of which the solvent mixture is returned to the reaction vessel. After removing about 40 g. of water, 8 g. of 85% strength phosphoric acid are added and the azeotropic distillation is continued until no further water passes over; the acid is then neutralized with calcium hydroxide added in the solid form. The product is concentrated in vacuo up to a temperature of 110° C. and then filtered. The solids content is about 92% by weight.

Etherified Phenol Resol 3

209 g. of Bisphenol A, and
365 g. of 30% strength formaldehyde are mixed with
82.5 g. of 40% strength sodium hydroxide solution.

The mixture is kept at 30° C. until the formaldehyde loading is about 3.7. The resol is then decomposed with dilute hydrochloric acid and washed free of electrolytes by repeated treatment with water.

738 g. of n-butanol, and
370 g. of toluene are added.

After adding 5 g. of phosphoric acid an azeotropic circulatory distillation is performed, in the course of which the solvent is again returned to the mixture. The distillation is continued until no further water passes over. The phosphoric acid is then neutralized with calcium hydroxide and the mixture concentrated in vacuo. The solids content of the resol is about 92%.

EXAMPLE 1

309 g. of the etherified Phenol Resol 2,
525 g. of ricinoleic acid methyl ester, and
1 g. of p-toluenesulphonic acid are mixed.

The mixture is heated in vacuo up to a temperature of 150° C. The reaction is continued at 150° C. until 110 g. of distillate have passed over. The etherified condensate is saponified with aqueous potassium hydroxide solution and subsequently acidified with dilute sulphuric acid. The resin is carefully freed of electrolytes and of excess acid by repeated washing with water and is thereafter mixed with an amount of diethylamine such that a pH value of 8 is reached. The resin is infinitely soluble in water.

The aqueous solution is suitable for electrophoretic desposition.

EXAMPLE 2

360 g. of etherified Phenol Resol 3, and
300 g. of ricinoleic acid methyl ester are heated in vacuo to 100–110° C., with the addition of
0.5 g. of p-toluene sulphonic acid, until the viscosity is 120–130 cp. (1:1 in butyl glycol, 20° C.).

The saponification number is 92. The product is saponified with 5 N aqueous sodium hydroxide solution and acidified with the equivalent quantity of 5 N sulphuric acid. The resin is then mixed with sufficient triethylamine to reach a pH value of 8. The resin can be infinitely diluted with water and is suitable for electrophoretic depositions.

EXAMPLE 3

360 g. of etherified Phenol Resol 3,
300 g. of ricinoleic acid methyl ester, and
260 g. of soya oil fatty alcohol are heated in vacuo to 100–110° C., with the addition of
0.5 g. of p-toluene sulphonic acid, until the viscosity is 120–130 cp. (1:1 in butyl glycol, 20° C.).

The saponification number is 67. The product is saponified with 5 N sodium hydroxide solution and acidified with the equivalent quantity of 5 N sulphuric acid. It is then mixed with sufficient triethylamine to reach a pH value of 8. The product can be infinitely diluted with water and on stoving at 170° C. for 30 minutes yields highly elastic coatings on sheet iron.

EXAMPLE 4

The procedure of Example 1 is followed, but the etherified Phenol Resol 2 is replaced by 250 g. of etherified Phenol Resol 1. The resulting product can be infinitely diluted with water and on stoving yields highly elastic coatings.

The invention furthermore relates to the use of the new condensates in binders and/or coating materials capable of dilution with water, as sole binders or mixed with such binders for stoving lacquers. A preferred use of the new condensates consists of their use as sole binders or mixed with other binders in coating compositions which can be deposited electrophoretically.

The coating compositions used according to the invention may be used unpigmented or pigmented and/or containing fillers. They can, for example, be applied to timber, concrete, brickwork, plaster or also to iron and steel, as well as to non-ferrous metals, with or without pretreatment such as passivation, phosphotization, electrochemical treatment, galvanizing, tin-plating or other metallization according to various processes, including the electrophoretic method of application. Pigments and/or fillers are, for example, without thereby restricting the invention, red iron oxide, carbon black, lead silicochromate, strontium chromate, blanc fix, micronized varieties of baryte, microtalc, colloidal chalk, diatomaceous earth, china clay, titanium dioxide, green chromium oxide and others.

The use of strongly basic pigments such as zinc oxide, zinc chromate, lead carbonate, basic lead sulphate, red lead or calcium plumbate requires precise testing. These pigments may be prone to thicken or precipitate. The ratio of the pigment to the binder depends on the pigment type employed and on the proposed end use. In most cases, the pigment-binder ratio will be 0.5:1 to 2:1. Only in the electrophoretic application can the pigment content also be below 0.5%.

The coating compositions used according to the invention must be stoved at elevated temperature. When using them as stoving lacquers, it can be advantageous to admix water-soluble or at least hydrophilic low molecular aldehyde condensation products, such as for example, phenolresols or condensation products which form aminoplasts.

Mixing the new water-soluble precondensate resins with relatively low molecular, at least hydrophilic, heat-curable condensation products such as reaction products which form aminoplasts and/or phenol resols and/or etherified phenol resols results in a higher cross-linking of the stoved coating compositions and hence in a further improvement of their technical lacquer properties, such as hardness, gloss, corrosion protection and the like.

By heat-curing there are also to be understood condensation products which when heated alone, while reaching a relatively high molecular state, do not yet reach an infusible state. It is also not absolutely necessary that the admixed condensation products should by themselves exhibit solubility in water; it is merely necessary for their hydrophilic character to suffice to result in adequate compatibility in combination with the new water-soluble precondensate-acid resins which may act as plasticizers, that is to say, stoved clear lacquer films should be homogeneous and no separation of the binder constituents must take place in the aqueous coating compositions at the processing concentration.

Heat-curable hydrophilic low molecular condensation products which form aminoplasts are, for example, aldehyde reaction products of such compounds capable of reaction with aldehydes as urea, ethylene urea, dicyandiamide and aminotriazines such as melamine, benzoguanamine, acetoguanamine and formguanamine. The abovementioned compounds may be reacted with aldehydes such as formaldehyde, acetaldehyde, crotonaldehyde, acrolein, benzaldehyde, furfurol and the like. By aldehydes there are also to be understood aldehyde-forming compounds such as paraformaldehyde, paraldehyde and trioxymethylene. The preferred aldehyde is formaldehyde and the preferred aldehyde-binding compounds are melamine and urea. The reaction takes place in the usual molar ratios, for example, in the case of urea resins at a usual formaldehyde molar ratio of 1:1.5 to 1:4, and in the case of melamine resins in a formaldehyde molar ratio of 1:1.5 to 1:6. The nitrogen-containing polyalcohols are preferably employed in a partially or completely alkylated or alcohol-modified form.

The etherification products of the lowest half-ethers of glycol and diglycol, such as ethyl glycol and ethyl diglycol, with the methylolmelamines, such as have already been described in Austrian Pat. 180,407, have also proved successful in the present instance.

A preferred position is occupied by low molecular condensation products of melamine with formaldehyde with a melamine-formaldehyde ratio of 1:1 to 1:6, which have been almost completely etherified with methanol. Ethers of nitrogen-containing polymethylol compounds which have been partially esterified with dicarboxylic acids, such as are, for example, obtained by a trans-esterification of hexamethoxymethylmelamine with adipic acid, are also suitable. Five to 50% by weight of these condensation products may be present in stoving lacquers according to this invention. Preferred melamine condensation products, capable of dilution with water, which mixed with the new condensates of the present invention can be used as coating materials, are those which have been obtained by reaction of aminotriazine formaldehyde condensation products etherified with alcohols and containing at least 1 mole of volatile alcohol residue in the ether bond, with aliphatic hydroxycarboxylic acid esters by warming, and which have been described in French Pat. 1,544,219 and the U.S. patent application Ser. No. 668,695. The percentage specified in each case relates to solid contents. Combinations of the new condensate in which the condensation product which forms aminoplastics is present at 10–30% by weight relative to solid contents are preferred.

The stoving lacquers which have been combined in this way can themselves be manufactured in the usual manner by bringing their components together. In general, it is appropriate to mix the water-soluble salts of ammonia or amines or mixtures of ammonia and amines and the carboxylic acid resins according to this invention with the other components in the form of concentrated aqueous solutions which may optionally contain minor quantities of water-soluble organic solvents and then, if necessary, to adjust the pH value of the mixed solutions to the desired values. The pH value of the desired solutions should in general appropriately be about 7.5–9.0, especially about 8; if necessary, it can be readjusted with ammonia or organic strong nitrogen bases after a prolonged storage time of the resins.

The combined stoving lacquers can contain the relevant usual additives, for example, minor quantities of water-soluble organic solvents in the presence of which the components of the stoving lacquer have been manufactured and/or other solvents such as monoalkyl ethers of diethylene glycol and triethylene glycol, and furthermore compounds of hexavalent chromium such as ammonium dichromate as well as soluble dyestuffs, pigments, agents for improving levelling, corrosion protection agents, stabilizers and/or cure catalysts.

The combined stoving lacquers can be applied to the articles to be lacquered using the usual methods; they are above all suitable for lacquering sheet metal. Here it is a particular advantage of the lacquers that they can also be deposited on the sheet metal by the electrophoresis process. The stoving of the lacquers may take place at temperatures from about 80 to 200, preferably from about 100 to 180° C., and over a time interval of about 10 to 80, preferably about 20 to 60, minutes depending on the stoving temperature.

The lacquers can optionally and in practically all cases advantageously contain, as an additional component, at least one additive resin which is soluble in the lacquer system, which differs from the precondensate and which is usual in relevant stoving lacquers capable of dilution with water, with the compatibility having to be taken into account when selecting the nature and amount of the additive resin.

When using the coating compositions according to the invention as binders for stoving lacquers, the addition of compounds containing hydroxyl groups, especially amines containing hydroxyl groups, preferably polyamines, have a favorable effect.

In a special embodiment, the coating compositions according to the invention contain a compound according to the following formula as the strong nitrogen base:

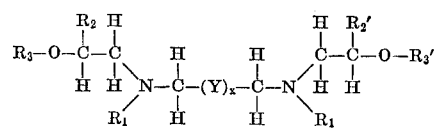

wherein the substituents and symbols have the following significance:

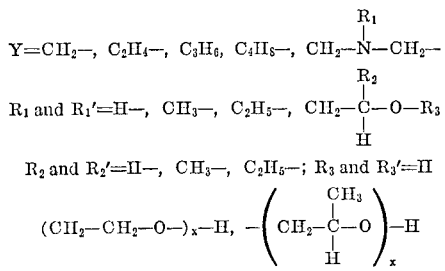

and $x$=zero or an integer between 1 and 6.

Those polyhydroxypolyamines according to the above general formula which are characterized by complete substitution of the hydrogen atoms of polyamines by the 2-hydroxypropyl group are preferred. Especially the polyhydroxypolyamines obtained by exhaustive reaction of diethylene triamine and diethylene tetramine with propylene oxide. The manufacture of the polyhydroxypolyamines mentioned above is described in French Pat. 1,497,222.

Specific examples of the compounds of the general formula are:

N,N'-bis-(2-hydroxypropyl)-ethylenediamine;
N,N'-bis-(hydroxyethyl)-ethylenediamine;
N,N,N'-tris-(2-hydroxypropyl)-ethylenediamine;
N,N,N',N'-tetrakis-(2-hydroxypropyl)-ethylenediamine;
N,N,N',N'-tetrakis-(hydroxyethyl)-ethylenediamine;
N,N,N',N'-tetrakis-(2-hydroxypropyl)-hexamethylenediamine;
N,N'-bis-(2-hydroxypropyl)-hexamethylenediamine;
N,N,N'N",N" - pentakis - (2 - hydroxypropyl)-diethylene; and
N,N,N',N,N",N' - hexakis - (2-hydroxypropyl)-triethylene tetramine.

EXAMPLE 5

The resin described in Example 2 was diluted to 40% solids content with deionized water and ground in a ceramic ball mill with a pigment mixture of red iron oxide (Bayer 510 F) and basic lead silicochromate (Oncor M 50) in the ratio 9:1 so that the pigment:binder ratio is 0.6:1. The paste is diluted with water to a solids content of 10%. The solution is filled into a 10 x 10 x 18 cm. steel basic and passivised metal sheets (Bonder 1025/5 Metallgesellschaft) are coated therein by applying an electrical direct voltage at constant voltage in the range of 100–120 v. for 2 minutes. The sheet metal is then stoved for 30 minutes at 170° C. Smooth sufficiently elastic coatings result.

EXAMPLE 6

The resin-carboxylic acid which was manufactured according to Example 1 is neutralized with N,N,N',N',N"-pentakis-(2-hydroxypropyl)-diethylene triamine until the aqueous solution has a pH value of 8. It is an advantage of this example that the coating materials manufactured with this synthetic resin capable of dilution with water can be applied in thick layers and that these can be stoved even on rapid heating without sputtering of lacquer material.

EXAMPLE 7

The procedure of Example 6 is followed but neutralization effected by adding N,N,N',N',N",N"-hexakis-(2-hydroxypropyl)-triethylene tetramine. This results in the same effects on stoving the coating material manufactured therefrom as is described in Example 6.

EXAMPLE 8

The resin-carboxylic acid obtained according to Example 2 is neutralized with N,N,N', N'-tetrakis-(2-hydroxypropyl)-ethylene diamine until the aqueous solution has a pH value of 8 (measured in 20% strength aqueous solution). The resin is miscible with water in all proportions. The solution is adjusted to a solids content of 60% by weight with deionized water. Coating materials manufactured therefrom can be applied in thick layers and can be stoved by rapid heating without the lacquer material sputtering.

EXAMPLE 9

The resin solution neutralized with triethylamine, according to Example 1, is diluted to a solids content of 40% by weight with deionized water. The solution is ground in a ball mill in the pigment/binder ratio of 0.8:1. The solution is then brought to the desired viscosity by dilution with butanol and applied to sheet iron by dipping or spraying. After stoving for 30 minutes at 170° C., clear hard elastic coatings result.

EXAMPLE 10

The procedure of Example 9 is followed, but the resin solution according to Example 2 is used.

EXAMPLE 11

The procedure of Example 9 is followed, but the resin solution according to Example 4 is used.

EXAMPLE 12

The procedure of Example 5 is followed, but the solution according to Example 4 is employed.

EXAMPLE 13

The procedure of Example 5 is followed, but the resin solution according to Example 1 is employed.

EXAMPLE 14

The resin solution obtained according to Example 2 according to the invention is mixed with hexamethoxymethylmelamine (Cymel 300 Cyanamid) in the weight ratio of 8:2. The solution is diluted to a solids content of 40% by weight with deionized water and is then ground in a ball mill with titanium dioxide in the ratio of 1:0.8. The solution is diluted to the desired viscosity with butanol and applied to sheet iron by spraying or dipping. After stoving for 30 minutes at 150° C., hard relatively light colored coatings result.

EXAMPLE 15

309 g. of the etherified phenol resol 2,
260 g. of linseed oil fatty alcohol,
132 g. of glycollic acid butyl ester, and
1 g. of paratoluenesulphonic acid are mixed. The mixture is heated to a temperature of 150° C. until about 60 g. of distillate have passed over. It is saponified with aqueous potassium hydroxide solution and subsequently acidified with the equivalent quantity of dilute sulphuric acid. The precipitated resin is carefully freed of electrolytes by repeated washing with water and subsequently mixed with sufficient triethylamine to reach a pH value of 8. The resin can be infinitely diluted with water.

EXAMPLE 16

The procedure of Example 15 is followed, but instead of linseed oil fatty alcohol, soya oil fatty alcohol is employed. Boiling is performed as specified in Example 15.

EXAMPLE 17

The procedure of Example 15 is followed, but instead of 260 g. of linseed oil fatty alcohol, 260 g. of stearyl alcohol are employed. Boiling is performed as specified in Example 15.

EXAMPLE 18

The procedure of Example 15 is followed, but the glycollic acid butyl ester is replaced by lactic acid ethyl ester. Instead of 132 g. of glycollic acid butyl ester, 132 g. of lactic acid ethyl ester are employed.

In a special embodiment of the invention, the synthetic resins, capable of dilution with water, manufactured according to the process of the invention and based on phenoplasts carrying carboxyl groups are used, mixed with novel amino-resin products, as binders for stoving lacquers. These new amino-resin products are obtained by precondensing aromatic and/or hydroaromatic epoxide compounds which contain at least two epoxide groups in the molecule by warming with amino-resin products, in the course of which:

(a) Amino-resin condensation products are employed which contain aliphatic monohydroxycarboxylic and/or dihydroxycarboxylic acid esters bonded in an ether-like manner, and/or (b) The precondensate is trans-etherified with an aliphatic monohydroxycarboxylic and/or dihydroxycarboxylic acid and/or preferably their esters, by warming, (c) The precondensates according to (a) or (b) having ester groupings are saponified in an alkaline medium and the resin-carboxylic acid is isolated therefrom, and (d) These are mixed with ammonia and/or strong organic nitrogen bases until the desired capability for dilution with water is reached. The manufacture of these new amino-resin products is described in detail in the German patent application carrying the file reference No. 2112. Example 19 shows an embodiment of this binder combination.

EXAMPLE 19

(A) Manufacture of a new amino-resin product 95 g. of hexamethoxymethylmelamine and 250 g. of an epoxide resin having an epoxide equivalent weight of 230 to 280, a refractive index of 1.5830 and a viscosity of 500–1000 cp. at 20° C., measured at 70% strength in butyl glycol, which was obtained in a known manner by alkaline condensation of Bisphenol A with epichlorhydrin, are mixed with one another.

2 g. of 50% strength methanolic solution of benzyltrimethylammonium hydroxide are added thereto. The mixture is kept at 130° C. under an inert gas until the viscosity is 120 cp. measured at 20° C., 2:1 in butyl glycol.

300 g. of ricinoleic acid methyl ester and 3 g. of para-toluenesulphonic acid are then added. The product is heated to 160° C. in vacuo and kept thereat until the viscosity is 100–105 cp. measured at 20° C., 1:1 in butyl glycol. The resin has a saponification number of 85. The product is then saponified with 5 normal aqueous sodium hydroxide solution, neutralized with the equivalent quantity of 5 N sulphuric acid, and the resin carefully freed of electrolytes by repeated washing with water. Sufficient triethylamine is then added for the pH value to reach 7.5 to 8. The resin can be infinitely diluted with water and is suitable for electrophoretic deposition.

(B) Manufacture of the stoving lacquer

The resin solution obtained according to Example 4 is mixed in the ratio of 8:2 with the amino-resin product solution manufactured according to (A). The mixture is ground on a ceramic ball mill with deionized water and with titanium dioxide Kronos RM 59 (Titangesellschaft) in such a way that the pigment/binder ratio is 0.5:1. The paste is diluted to a solids content of 10% with deionized water. This solution is then electrophoretically deposited under the conditions given in Example 5. After stoving at 150° C. for 30 minutes, hard, smooth coatings result.

In a further special embodiment of the invention, the resins according to the invention are combined with novel ammonia or amine salts of precondensates of phenolplasts carrying carboxyl groups and epoxide resins as mixtures, the new precondensates carrying carboxyl groups having been obtained by a process which is characterized in that aromatic and/or hydroaromatic epoxide compounds which contain at least two epoxide groups in the molecule are precondensed by warming with heat-curable phenol-aldehyde condensation products, with—

(a) Such heat-curable phenol-aldehyde condensation products are employed as contain hydroxycarboxylic acid esters bonded in an ether-like manner, and/or (b) The precondensate being trans-etherified with a hydroxycarboxylic acid and/or preferably its ester, (c) The precondensates according to (a) or (b) having ester groupings being saponified in an alkaline medium and the resin-carboxylic acid thereafter isolated and (d) This acid being mixed with ammonia and/or strong organic nitrogen bases until the desired ability to be diluted with water is reached.

The manufacture of these new phenoplasts carrying carboxyl groups is described in detail in the German patent application carrying the file reference No. 2101.

EXAMPLE 20

(A) Manufacture of the new precondensate carrying carboxyl groups (a) Manufacture of the etherified phenol resol as the starting product.

Etherified Phenol Resol 2

686.5 g. of p-tert.-butyl phenol resol are dehydrated in vacuo up to 90° C., and
1650 g. of n-butanol, and
835 g. of toluene are then added.

The mixture is heated to boiling and the water removed by azeotropic distillation, with the solvent mixture being returned to the reaction vessel. After removing about 40 g. of water 8 g. of 85% strength phosphoric acid are added and the azeotropic distillation is continued until no further water passes over; the acid is then neutralized with calcium hydroxide added in the solid form. The product is concentrated in vacuo up to a temperature of 110° C. and then filtered. The solids content is about 92% by weight.

(b) Manufacture of the precondensate.

155 g. of etherified phenol resol 2,
78 g. of an epoxide resin having an epoxide equivalent weight of 230 to 280, a refractive index of 1.5830 and a viscosity of 500–1000 cp. at 25° C. measured at 70% strength in butyl glycol which was obtained in a known manner by alkaline condensation of bisphenol A with epichlorhydrin, and 3 g. of a 50% strength methanolic solution of benzyltrimethylammonium hydroxide are mixed.

The mixture is heated for 2 hours to 140° C. The viscosity is then 190 cp. measured at 20° C., 2:1 in butyl glycol. 120 g. of ricinoleic acid methyl ester and 4 g. of paratoluenesulphonic acid are added and the product is heated at 140° C. in vacuo until 53 g. of distillate have passed over. The viscosity of the product is 920 cp. measured at 20° C., 1:1 in butyl glycol, and the saponification number is 90. The product is saponified with 5 N sodium hydroxide solution, acidified with the equivalent quantity of 5 N sulphuric acid, and the water removed from the mixture by azeotropic distillation with xylene. Thereafter the product is filtered. Sufficient triethylamine is then added for the pH value to reach 8. The xylene is removed in vacuo. The resulting clear resin is infinitely soluble in water, has an acid number of 80 and a viscosity of 230 cp. measured at 20° C., 1:1 in butyl glycol. It can be used for electrophoretic deposition and herein yields hard elastic coatings after stoving.

(B) Manufacture of the stoving lacquer

The resin solution obtained according to Example 4 is mixed with the solution of precondensate carrying carboxyl groups obtained according to (A), in the ratio of 8:2. The solution is diluted to 40% solids content with deionized water and ground on a ceramic ball mill with a pigment mixture of red iron oxide (Bayer 510 F) and basic lead silicochromate (Onkor M 50) in the ratio of 9:1 in such a way that the pigment/binder ratio is 0.8:1.

The paste is brought to the desired viscosity by dilution with butanol. It is is applied to sheet iron by brushing, dipping or spraying. After stoving for 30 minutes at 170° C., hard, smooth coatings of very good corrosion resistance result.

EXAMPLE 21

The resin solution obtained according to Example 1 is mixed with the phenoplast described under (A) in Example 20, in the ratio of 7:3. The mixture is diluted to a solids content of 40% with deionized water. The solution is ground with a pigment mixture of red iron oxide (Bayer 510 F) and basic lead silicochromate (Onkor M 50) in the ratio of 9:1. The solution is diluted to 10% solids content with water and deposited under the conditions specified in Example 5. After stoving for 30 minutes at 130° C., hard, smooth coatings of very good corrosion resistance result.

EXAMPLE 22

340 g. etherified phenol resol 2
70 g. dimethylylpropionic acid are mixed and heated under vacuum to 150–160° C. and held at this temperature until approximately 100 g. distillate (butanol) have pased over. The product then has a viscosity of 150 cp. measured 1:1 in butyl glycol at 20° C. and an acid number of 90.

The product is diluted with isopropyl glycol to a solids content of 80%. The neutralized resin can at pH 8.5 be diluted without limit.

It is less suitable for electrophoretic coating as sole binding agent, however, it is excellent as a curing addition for plasticizing electrophoretic resins.

In further developing the present invention it has now been found that particularly advantageous results are achieved if water-soluble air-drying synthetic resins made from drying and/or semi-drying oils, consisting of condensation products of fatty acid which are essentially free of fatty acid, are used as other binders in the mixture, in which process fatty acids having not less than 6 C-atoms which are free of hydroxy groups and are at least partially unsaturated, and which predominantly contain such fatty acids free of hydroxyl groups or monoketones derived therefrom, are heated in the presence of a small quantity of boron or of its oxygen-containing compounds as a condensation catalyst to a temperature between 220 to 230° C. with azeotropic removal of the resulting water of reaction and return of the evaporated fatty acids, and in which the condensation product contains at least 40% of unsaponifiable matter having a mean molecular weight of a condensation product of at least 3 molecules of the corresponding fatty acids, and wherein subsequently the unreacted fatty acids have been separated from the reaction mass in a known manner by extraction or distillation, these condensation products, of which the manufacture is described in German Pat. 1,073,665, having been reacted with such quantities of $\alpha,\beta$-ethylenically unsaturated monocarboxylic and/or polycarboxylic acids, and, to the extent that they exist, their anhydrides, optionally in the presence of other vinyl or vinylidene compounds, by heating for such a time that the reaction products possess an acid number of at least 35, and thereafter being mixed with such quantities of ammonia and/or strong nitrogen bases at temperatures below 50° C. that the reaction products have become adequately capable of being dispersed in water or diluted with water. Preferably, condensation products are employed which have been produced by reaction of fatty acid condensation products with maleic anhydride and which have acid numbers of between 50 and 250, preferably 100 and 160.

The advantage in using the new phenolic resin-carboxylic acids which are distinguished by their good stability in aqueous alkaline solution, is noteworthy, especially when using the synthetic resins capable of dilution with water which have already been mentioned above as a combination, which is also distinguished by its great stability in aqueous alkaline solution.

In the new binder combination used, such phenolic resin-carboxylic acids are preferentially employed as have been obtained by trans-etherification with short chain hydroxy carboxylic acids having 2–6 C-atoms. Herein the new conjointly used component which has already been mentioned is employed as a synthetic resin which exerts a plasticizing action. The air-drying synthetic resins capable of dilution with water which are conjointly used in the combination, and the process for the manufacture of these, is described in detail in German printed patent application 17 45 352.0.

Advantageous results are obtained if from 10 to 60% by weight, relative to the total binder content, of the phenolic resin-carboxylic acid obtainable according to the previously disclosed examples is used as the binder component.

The other, previously mentioned, binder component, from the reaction of the fatty acid condensation products with $\alpha,\beta$-ethylenically unsaturated monocarboxylic or dicarboxylic acids of the combination is used as a synthetic resin exerting a plasticizing action in amounts of 40 to 90% by weight relative to the binder content mentioned.

The binders combined in this way are worked up to stoving lacquers capable of dilution with water, and the methods already described in the previous examples may here be employed. The best results are obtained if phenolic resin-carboxylic acids which have been obtained by trans-etherification with short chain hydroxycarboxylic acids having 2–6 C-atoms are mixed with the fatty acid condensate-maleic anhydride adducts in a weight ratio of 10:90 to 30:70.

The combined binders may, as previously described, be applied mechanically or electrophoretically and stoved.

EXAMPLE 23

(a) Manufacture of an unsaponifiable fatty acid condensate-maleic anhydride adduct:

110 g. of a fatty acid mixture which consists of 50% by weight of oleic acid, 46% by weight of linoleic acid, 3% by weight of saturated fatty acids and 1% by weight of resin acids, and 2.75 g. of crystalline boric acid are introduced into a 250 ccs. flask on which a fractionating column was vertically mounted. This column was connected to a vacuum pump via an air condenser and a receiver.

The fractionating column was filled with packings of stainless steel spirals or glass Raschig rings. After evacuating the device to about 2–3 mm. mercury column the flask was slowly heated by means of a metal bath until the bath temperature was 290° C. The bath temperature was first brought to 210° C. over the course of 60 minutes. The bath temperature was then raised from 210 to 290° C. over the course of 150 minutes. The bath was kept at the latter temperature for a further 3 hours. The fractionating column was heated to 175° C. by means of an electrical resistance heater. Material began to distill over into the receiver from about 210° C. bath temperature onwards. The condensation of the material entering the fractionating column began at a lower bath temperature. After the reaction mixture had been heated to 290° C. for 3 hours, it was cooled. The boric acid contained therein was filtered off while the residue was still warm. The reaction product (=starting condensation product) has a viscosity of 60 p., an acid number of 5.5 and a refractive index of 1.500 at 20° C.

100 g. of this reaction product (=starting condensation product) are heated to 150° C. 25 g. of maleic anhydride are added thereto. The mixture is heated to 180–200° C. and kept at this temperature until the content of free maleic anhydride has fallen to below 1%. 6 g. of water are then added and the mixture is heated to 100° C. for 2 hours. The product has an acid number of 132 and a viscosity of 260 p. measured at 20°, 1:1 in butyl glycol.

It is diluted to a solids content of 70% by weight with isopropyl glycol and such an amount of triethylamine is added that the product can be easily diluted with water.

(b) Manufacture of the stoving lacquer:

The resin obtained according to (a) is mixed in a weight ratio of 7:3 with the phenolic resin-carboxylic acid described in Example 22 which has been neutralized with triethylamine. The mixture is then diluted with water to a solids content of 40%. 10 kg. of this solution are ground with 2 kg. of red iron oxide in a ball mill and diluted to a solids content of 10% with deionized water. The 10% strength solution is filled into an electrophoresis test basin holding two liters. Degreased steel sheets each of 150 cm.$^2$ surface area are used as the cathode and anode. On applying a direct voltage of 150 v., the sheet serving as the anode is uniformly coated with the lacquer. The coatings stoved at 170° C. are very corrosion-resistant. After 3 weeks' storage at 50° C., the bath liquid had not changed its pH value which was about 8.0.

EXAMPLE 24

(a) Manufacture of an unsaponifiable fatty acid condensate-maleic anhydride adduct:

The procedure of Example 23 is followed, but 110 g. of a fatty acid mixture are employed which consists of 25 to 30% by weight of oleic acid, 65 to 70% by weight of linoleic acid, and 5% by weight of saturated fatty acids. The condensate has a viscosity of 60 p., an acid number of 5.5 and a refractive index of 1.5 at 20° C.

100 g. of this reaction product are reacted at 180–200° C. with 20 g. of maleic anhydride until the content of free maleic anhydride has fallen to below 1%. 6 g. of water are then added and the mixture is heated to 100° C. for 2 hours. The product has an acid number of 87, and a viscosity of 1300 cp. measured at 20° C., 1:1 in butyl glycol.

The resin is diluted to a solids content of 70% with isopropyl glycol.

(b) Manufacture of the stoving lacquer:

The procedure of Example 23 is followed, with the resin obtained under Example 24 being employed.

Preferably, such fatty acid condensates are employed as have been produced by condensation from fatty acid mixtures which contain at least 20% by weight of linoleic acid and at least 20% by weight of oleic acid.

In further developing the present invention, it has now been found that particularly advantageous results are achieved if, as other binders in the mixture, water-soluble synthetic resins are employed which are obtained by (a) Etherifying compounds carrying epoxide groups and optionally also hydroxyl groups, having the general formula

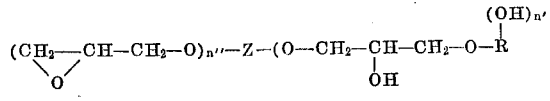

wherein (I) Z=an alkyl, aryl or cycloalkyl group; $n$=zero and $n''$=1, or
(II) Z=an alkylene, arylene or cycloalkylene group if $n, n''$=1 or if $n$=zero and $n''$=2 or
(III) Z denotes the group of the following formula:

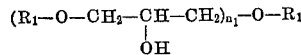

if $n$=zero and $n''$=2, or if $n, n''$=1, with $n_1$ in each case=zero or a small number and $R_1$ representing an aliphatic or aromatic group with (b) Monohydric alcohols having 3 to 20 carbon atoms which contain at least one and preferably several ethylenic double bonds, by heating, optionally in the presence of catalysts, and (c) Reacting the etherification products with such quantities of α,β-ethylenically unsaturated monocarboxylic and/or polycarboxylic acids and, to the extent that they exist, their anhydrides and/or their half-esters with monoalcohols having 1 to 4 C-atoms, optionally in the presence of other vinyl or vinylidene compounds, by heating, so that the reaction products have an acid number of at least 25, and (d) Thereafter mixing the reaction products containing carboxyl groups with such amounts of ammonia and/or strong organic nitrogen bases that they are completely or partially neutralized, and that the reaction products are sufficiently capable of dispersion in water or dilution with water.

The advantage in the use of the new phenolic resin-carboxylic acids obtained according to the process of the present invention, which are distinguished by their good stability in aqueous alkaline solution, is noteworthy, especially when using the synthetic resins capable of dilution with water and already mentioned above, as a combination which is also distinguished by its high stability in aqueous alkaline solution.

In the new binder combination employed, such phenolic resin-carboxylic acids are preferentially used as have been obtained by trans-etherification with short chain hydroxycarboxylic acids having 2–6 C-atoms. Herein the newly conjointly used component already mentioned is employed as a synthetic resin exerting a plasticizing action. The synthetic resins capable of dilution with water which are conjointly used in the combination, and the process of manufacture of these, are described in German printed patent application 17 45 351.9.

Advantageous results are obtained if from 10 to 60% by weight, relative to the total binder content, of the phenolic resin-carboxylic acid is used as the binder component.

The other binder component, already mentioned, of the combination is used as a synthetic resin exerting a plasticizing action in amounts of 40 to 90% by weight relative to the binder content mentioned.

The binders which have been combined in this way are worked up into stoving lacquers capable of dilution with water, as already described.

Plasticizing synthetic resins which are very particularly suitable are those which have been produced by etherifying epoxide resins, which have been produced in a known manner by condensation of bisphenol A with epichlorhydrin, with unsaturated fatty alcohols such as soya oil alcohol or linseed oil alcohol and subsequently reacting these polyethers with such quantities of a mixture of vinyl compounds with acrylic acid that the resulting end products contain 10–30% by weight of polymerized-on monomers. Herein styrene, α-methylstyrene, vinyltoluene and butyl acrylate, alone or as mixtures, are particularly suitable as vinyl monomers. The acid numbers of the plasticizing synthetic resins are herein preferably between 35 and 80. Particularly good results are achieved if these synthetic resins exerting a plasticizing action are combined with such phenolic resin-carboxylic acids as have been obtained by trans-etherification with short chain hydroxycarboxylic acids having 2–6 C-atoms. The mixing ratio of plasticizing synthetic resin to phenolic resin-carboxylic acid is, in this preferred embodiment, between 70–30 and 90–10% by weight.

EXAMPLE 25

(a) Manufacture of the vinyl-modified polyether:

260 g. of soya fatty alcohol and 0.6 g. of a 40% strength solution of boron trifluoride in ether are dissolved in 150 g. of dioxane. A solution of 280 g. of an epoxide resin having an epoxide equivalent weight of 240 to 290, a viscosity of 500 to 1000 cp. measured at 70% strength in butyl glycol at 25° C., and a refractive index of 1.5830, which was obtained in a known manner by condensation of bisphenol A with epichlorhydrin, in 150 g. of dioxane is added dropwise thereto at 80° C. After completion of the addition the mixture is kept for a further hour at 80° C. The dioxane is then removed by vacuum distillation.

A mixture of 127 g. of styrene, 33 g. of acrylic acid, 6 g. of di-tert.butyl peroxide and 6 g. of laurylmercaptan is added dropwise to the residue at 150° C. over the course of 2.5 hours. After completion of the addition the mixture is kept at 150° C. until the solids content has reached 98% by weight. The remainder of the unreacted monomers is then removed by vacuum distillation. The product has a viscosity of 250 cp. measured 1:1 in butyl glycol at 20° C. and an acid number of 32. It is diluted to a solids content of 80% by weight with isopropyl glycol. The resin neutralized with triethylamine can be infinitely diluted with water.

(b) Manufacture of the stoving lacquer:

The resin obtained according to (a) is mixed in a weight ratio of 7:3 with the phenolic resin-carboxylic acid described in Example 22 which has been neutralized with triethylamine. The mixture is then diluted to a solids content of 40% with water. 10 kg. of this solution are ground in a ball mill with 2 kg. of red iron oxide and diluted to a solids content of 10% with deionized water. The 10% strength solution is filled into an electrophoresis experimental basin holding 2 liters. Degreased steel sheets each of 150 cm.² surface area are used as the cathode and anode. On applying a direct voltage of 150 v. the sheet serving as the anode is uniformly coated with the lacquer. The coatings stoved at 170° C. are very corrosion-resistant. After 3 weeks' storage at 50° C., the bath liquid had not changed its pH value which was about 8.0.

In further developing the present invention, it has now been found that particularly advantageous results are achieved if there are used, as other binders in the mixture, water-soluble air-drying or stovable synthetic resins which are obtained.

(1) By thermal reaction of at least one phenolic resin (I) with at least one ethylenically unsaturated fatty acid (II) having at least 14 carbon atoms; or (2) By thermal reaction in stage A of at least one phenolic resin (I) with at least one ester (III and IV) of ethylenically unsaturated fatty acids with at least one monohydric and/or polyhydric alcohol and subsequent decomposition of the ester in stage B and optional separation of the alcohols liberated and of inorganic salts which may be present; or (3) By blocking of phenolic hydroxyl groups still remaining in the products according to (1) and/or (2) by reaction with compounds containing oxirane rings which are capable of reaction with phenolic hydroxyl groups, with the reaction of the products obtained according to (2) with the compounds containing oxirane rings preferably taking place after stage A as stage A₁ and with the decomposition of the esters taking place subsequently; or (4) By copolymerization of the products according to (1) and/or (2), which in this case is preferably effected after stage A, and/or the product (3), which is in this case preferably effected after stage A₁, with vinyl compounds (V) and/or vinylidene compounds (VI) with warming and preferably in the presence of polymerization catalysts, and decomposition of the ester, to the extent that products according to (2) or (3) have been copolymerized in stage A, with the copolymerization, in the preferred variant, only being effected after stage B; or (5) By modification of the products according to (1) and/or (2) and/or (3), which in the latter case can optionally also take place after stage A or stage A₁ and/or of the products (4) with cyclopentadiene or dicyclopentadiene (VII) with warming; or (6) By thermal reaction of at least one phenolic resin (I) with at least one ethylenically unsaturated fatty acid (II) having at least 14 C-atoms which has been copolymerized with a vinyl compound (V) and/or vinylidene compound (VI) with warming, preferably with the use of polymerization catalysts; or (7) By thermal reaction of at least one phenolic resin (I) with at least one ethylenically unsaturated fatty acid (II) having at least 14 C-atoms which has been modified with cyclopentadiene or dicyclopentadiene (VII) with warming; or (8) By thermal reaction, in stage A, of at least one phenolic resin (I) with at least one ester (III and IV) of ethylenically unsaturated fatty acids (II) with monohydric and/or polyhydric alcohols, which has been copolymerized with vinyl compounds (V) and/or vinylidene compounds (VI), and subsequent decomposition of the esters in stage B and optionally separation of the liberated alcohols and of the inorganic salts which may be present; or (9) By thermal reaction, in stage A, of at least one phenolic resin (I) with at least one ester (III and IV) of ethylenically unsaturated fatty acids (II) with monohydric and/or polyhydric alcohols which has been modified with cyclopentadiene or dicyclopentadiene (VII) with warming, and subsequent decomposition of the esters in stage B and optional separation of the alcohols liberated and of inorganic salts which may be present; or

(10) Reaction of the products according to (1) to (9) with α,β-ethylenically unsaturated dicarboxylic acids or, to the extent that they exist, their anhydrides (VIII), with warming.

Such condensation products exerting a plasticizing action are preferably employed as have been obtained by reaction of fatty acid mixtures or their esters, which contain at least 30% of linoleic acid and at least 20% of oleic acid and less than 10% of saturated fatty acids, with alkylphenolic resins such as, for example, tert.-butyl phenolic resins, and as have subsequently, optionally after saponification of the ester groups and separating off of the salts thereby formed, been reacted with mixtures of vinyl compounds with acrylic acid, fumaric acid or maleic anhydride, individually or as mixtures, in the presence of polymerization catalyst and with heating. Herein, styrene, vinyltoluene, α-methylstyrene and butyl acrylate, individually or as mixtures, are suitable as vinyl compounds. The proportion of monomers is herein preferably 10–30% by weight relative to the end product.

The advantage in the use of the new phenolic resin-carboxylic acids obtained according to the process of the present invention, which are distinguished by their good stability in aqueous alkaline solution, is noteworthy, especially when using the synthetic resins capable of dilution with water and already mentioned above, as a combination, which is also distinguished by its high stability in aqueous alkaline solution.

In the new binder combinations used, such phenolic resin-carboxylic acids are preferentially employed as have been obtained by trans-etherification with short chain hydrocarboxylic acids having 2–6 C-atoms. Herein the newly conjointly used component already mentioned is employed as a synthetic resin exerting a plasticizing action. The air-drying synthetic resins capable of dilution with water which are conjointly used in the combination, and the process for the manufacture of these, is described in detail in German printed patent application 17 45 336.0 of May 18, 1967, and U.S. patent application Ser. No. 728,920.

Advantageous results are obtained if 10 to 60% by weight, relative to the total binder content, of the phenolic resin-carboxylic acids is used as the binder component.

The other binder component already mentioned, obtained from the reaction of the fatty acid condensation products with α,β-ethylenically unsaturated monocarboxylic or dicarboxylic acids, of the combination is used as a synthetic resin exerting a plasticizing action, in amounts of 40 to 90% by weight relative to the binder content mentioned.

The binders combined in this way are worked up into stoving lacquers capable of dilution with water, and the methods, as previously described, may be used herein. The best results are obtained if phenolic resin-carboxylic acids which were obtained by trans-etherification with short chain hydroxycarboxylic acids having 2-6 C-atoms are mixed with such fatty acid condensates exerting a plasticizing action as have been obtained by reaction of alkylphenolic resins with fatty acid mixtures or their esters, as have already been described above, and which have subsequently been reacted with mixtures of vinyl compounds with $\alpha,\beta$-unsaturated monocarboxylic and/or polycarboxylic acids, as have already been described above, in a weight ratio of 10-90 to 30-70% by weight.

In some cases, especially when using the resin combinations according to the invention for the electrophoretic coating process, it can be of advantage not only to mix the resin combinations but also to precondense by heating. This precondensation is preferably effected in the temperature range of 100-180° C. and is carried out until the desired end viscosity is reached. When using the resin combinations according to the invention for the electrophoretic coating process, the viscosity of the precondensed resin combinations should not exceed a viscosity of Q measured 1:1 in butyl glycol at 20° C. in the Gardner-Holdt test.

EXAMPLE 26

(a) Manufacture of a vinyl-modified phenolic resin-fatty acid condensate:

33 parts of phenolic resin 1 and 66 parts of wood oil are reacted at 200-210° C. until the viscosity has risen to 600-650 cp./20° C. The reaction takes place under an inert gas. Thereafter the mix is cooled and reacted with 5 parts of propylene oxide at 100° C.

The mix is kept at 100 to 120° C. under reflux for about 2 hours. After completion of the reaction, the excess propylene oxide is removed by vacuum distillation. The viscosity of the resulting reaction product is about 750 cp./20° C.; the saponification number is about 115.

The amount of potassium hydroxide solution required for the saponification of the resin according to the saponification number is saponified using an excess of 10-20% of potassium hydroxide, which has been predominantly dissolved in ethanol. The saponification is effected by heating under reflux and under a nitrogen atmosphere. After about 3 hours boiling under reflux the saponification is complete. The mixture is neutralized with dilute hydrochloric acid (1 part of hydrochloric acid, 1 part of water) until the resin precipitates from the solution. The water of decomposition is separated off, after which the remaining resin solution is washed 3 times with water. The resin obtained after the third wash is freed of water by azeotropic distillation with xylene. As soon as no further water collects in the water separator the traces of water still remaining in the resin and the xylene are removed by vacuum distillation. In the course of this the temperature may rise to 160° C. Remaining sodium chloride also precipitates from the anhydrous resin and this is separated off by filtration. The viscosity is 180-250 cp., measured at 66% strength in white spirit. 677 parts of this dehydrated resin are mixed at 150° C., within 2.5 hours with a mixture consisting of 142 parts of styrene,
385 parts of $\alpha$-methylstyrene
46 parts of acrylic acid and
20 parts of di-tert.-butyl peroxide Thereafter the temperature is kept at between 150 and 160° C. until a solids content of 83% by weight has been reached. The excess monomer is distilled off in vacuo. The viscosity is about 250 to 280 cp. measured at 20° C., 1:1 in butyl glycol. The resin is diluted to a solids content of 70% with isopropyl glycol.

(b) Manufacture of the stoving lacquer:

The resin obtained according to (a) is mixed with the resin obtained in Example 22 in the ratio of 9:1. The resin mixture is neutralized with triethylamine and diluted to a solids content of 40% with water.

The resin solution is then ground in a ceramic ball mill in such a way that the pigment/binder ratio is 1:1. The stoving lacquer is suitable for lacquering steel sheets, and for this the lacquer can be applied by spraying or dipping after adjusting to the desired viscosity.

EXAMPLE 27

The procedure of Example 26 is followed but the components (a) and (b) are not only mixed but procondensed for 1 hour at 120° C. The resin is then neutralized with triethylamine. The mixture is then diluted with water to a solids content of 40%. 10 kg. of this solution are ground with 2 kg. of red iron oxide in a ball mill and diluted to a solids content of 10% with deionized water. The 10% strength solution is filled into an electrophoresis experimental basin holding 2 liters. Degreased steel sheets each of 150 cm.$^2$ surface area are used as cathode and anode. On applying a direct voltage of 150 v. the sheet serving as the anode is uniformly coated with the lacquer. The coating stoved at 170° C. are very corrosion-resistant. After 3 weeks storage at 50° C., the bath liquid has not changed its pH value which was about 8.0.

The preceding examples can be repeated with similar success by substituting the generically and specifically described reactants and operating conditions of this invention for those used in the preceding examples.

From the foregoing description, one skilled in the art can easily ascertain the essential characteristics of this invention, and without departing from the spirit and scope thereof, can make various changes and modifications of the invention to adapt it to various usages and conditions. Consequently, such changes and modifications are properly, equitably, and intended to be, within the full range of equivalence of the following claims.

We claim:
1. A process for the manufacture of amine salts of phenoplasts carrying carboxyl groups comprising:
    (a) etherifying at a temperature between about 100 to 150° C. heat-curable phenol-aldehyde condensation products consisting essentially of mononuclear and polynuclear phenols having 6 to 17 carbon atoms condensed with formaldehyde and partially etherified with lower monohydric aliphatic alcohols having 1 to 4 carbon atoms, with a compound selected from the group consisting of aliphatic monohydric-carboxylic acid having 2 to 20 carbon atoms, dihydroxy-carboxylic acids having 2 to 20 carbon atoms, and mixtures thereof to form a trans-etherification product having an acid number between about 30 and 150;
    (b) separating the etherified phenolic resin-carboxylic acid; and
    (c) mixing the separated phenolic resin-carboxylic acid with a compound selected from the group consisting of ammonia, strong organic nitrogen bases and mixtures thereof, said strong organic nitrogen bases defined as amines selected from the group consisting of secondary or tertiary amines which reach a pH value of at least 9 to 50 percent aqueous solution.

2. The process of claim 1, wherein said hydroxycarboxylic acids have 2 to 6 carbon atoms and mono-alcohols having 10 to 20 carbon atoms are conjointly used as plasticizing components.

3. The process of claim 1, wherein said hydroxycarboxylic acid is selected from the group consisting of ricinoleic acid and mixtures thereof, and up to 20 percent by weight is replaced by one of the compounds selected from the group consisting of glycollic acid, lactic acid, dimethylolpropionic acid, and mixtures thereof.

4. The process according to claim 1, wherein said heat-curable phenol-aldehyde condensation products are etherified with long chain monohydric alcohols having 6 to 30 carbon atoms.

5. The process according to claim 1, wherein said heat-curable phenol-aldehyde condensation products are etherified with long chain monohydric alcohols having 10 to 20 carbon atoms.

6. The process according to claim 1, wherein said hydroxycarboxylic acid is employed in such quantities that the end product has acid numbers of between 30 and 80.

7. The resin product obtained by the process of claim 1.

8. A process for the manufacture of amine salts of phenoplasts carrying carboxyl groups comprising:
(a) etherifying at a temperature between about 100 to 150° C. heat-curable phenol-aldehyde condensation products consisting essentially or mononuclear and polynuclear phenols having 6 to 17 carbon atoms condensed with formaldehyde and partially etherified with low monohydric aliphatic alcohols having 1 to 4 carbon atoms, with a compound selected from the group consisting of esters of aliphatic monohydric carboxylic acids having 2 to 20 carbon atoms with alcohols having 1 to 6 carbon atoms, esters of dihydroxy carboxylic acids having 2 to 20 carbon atoms with alcohols having 1 to 6 carbon atoms and mixtures thereof, to form a trans-etherification product having an acid number of between about 30 and 150;
(b) saponifying said trans-etherification product in an alkaline medium to remove the ester groupings;
(c) separating the etherified phenolic resin carboxylic acid; and
(d) mixing the separated phenolic resin carboxylic acid with a compound selected from the group consisting of ammonia, strong organic nitrogen bases and mixtures thereof, said strong organic nitrogen bases defined as amines selected from the group consisting of secondary or tertiary amines which reach a pH value of at least 9 in 50 percent aqueous solution.

9. The process of claim 8, wherein the carboxylic acids are esterified with alcohols having 1 to 6 carbon atoms, and are selected from the group consisting of the esters of glycollic acid, lactic acid, dimethylolpropionic acid, ricinoleic acid and hydroxystearic acid.

10. The process of claim 8, wherein said esters of hydroxycarboxylic acid are ricinoleic acid esters and up to 20 percent by weight is replaced by one of the esters selected from the group consisting of glycollic acid esters, lactic acid esters, dimethylolpropionic acid esters and mixtures thereof.

11. A process for the manufacture of amine salts of phenoplasts carrying carboxyl groups comprising:
(a) etherifying at a temperature between about 100 to 150° C. heat-curable phenol-aldehyde condensation products consisting essentially of mononuclear and polynuclear phenols having 6 to 17 carbon atoms condensed with formaldehyde and partially etherified with lower monohydric aliphatic alcohols having 1 to 4 carbon atoms, with a compound selected from the group consisting of aliphatic monohydric-carboxylic acids having 2 to 20 carbon atoms, dihydroxycarboxylic acids having 2 to 20 carbon atoms, and mixtures thereof to form a trans-etherification product having an acid number of between about 30 and 150;
(b) subjecting said trans-etherification product to an azeotropic distillation to separate off water, and the azeotropic entraining agent subsequently removed by heating in vacuo;
(c) converting the distillation residue to the free-resin-carboxylic acid by adding acids and that herein the acid is added in such amounts that it largely neutralizes the alkali and this acid is not present in excess over the total alkali content;
(d) separating the resulting salt; and (e) converting the resin-carboxylic acid into water-soluble products by adding a compound selected from the group consisting of ammonia, strong organic nitrogen bases and mixtures thereof, said strong organic nitrogen bases defined as amines selected from the group consisting of secondary or tertiary amines which reach a pH value of at least 9 in 50 percent aqueous solution.

12. The process of claim 11, wherein compounds according to the general formula

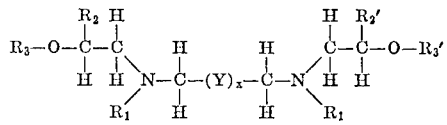

are employed as said strong organic nitrogen bases, wherein the substituents and symbols have the following significance:

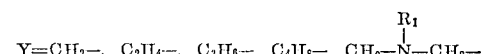

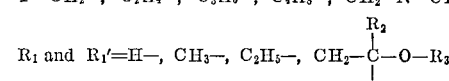

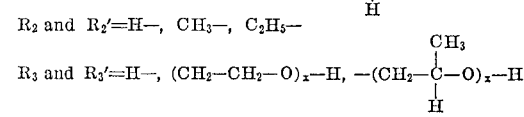

and $x$=zero or an integer between 1 and 6.

13. A process for the manufacturre of amine salts of phenoplasts carrying carboxyl groups comprising:
(a) etherifying at a temperature between about 100 to 150° C. heat-curable phenol-aldehyde condensation products consisting essentially of mononuclear and polynuclear phenols having 6 to 17 carbon atoms condensed with formaldehyde and partially etherified with lower monohydric aliphatic alcohols having 1 to 4 carbon atoms, with a compound selected from the group consisting of esters of aliphatic monohydric carboxylic acids having 2 to 20 carbon atoms with alcohols having 1 to 6 carbon atoms, esters of dihydroxy carboxylic acids having 2 to 20 carbon atoms with alcohols having 1 to 6 carbon atoms and mixtures thereof, to form a trans-etherification product having an acid number of between about 30 and 150;
(b) saponifying said trans-etherification product in an alkaline medium to remove the ester groupings;
(c) subjectng said trans-etherification product to an azeotropic distillation to separate off water, and the azeotropic entraining agent subsequently removed by heating in vacuo;
(d) converting the distillation residue to the free resin-carboxylic acid by adding acids and that herein the acid is added in such amounts that it largely neutralizes the alkali and this acid is not present in excess over the total alkali content;
(e) separating the resulting salt; and
(f) converting the resin-carboxylic acid into water-soluble products by adding a compound selected from the group consisting of ammonia, strong organic nitrogen bases and mixtures thereof, said strong organic nitrogen bases defined as amines selected from the group consisting of secondary or tertiary amines which reach a pH value of at least 9 in 50 percent aqueous solution.

14. The process of claim 4, wherein compounds according to the general formula

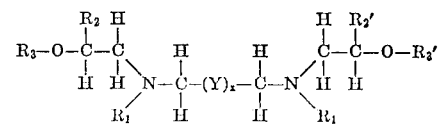

are employed as said strong organic nitrogen bases, wherein the substituents and symbols have the following significance:

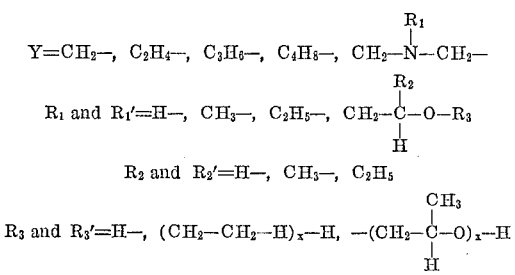

and $x$=zero or an integer between 1 and 6.

References Cited

UNITED STATES PATENTS

| | | | |
|---|---|---|---|
| 2,681,894 | 6/1954 | Hoenel | 260—20 |
| 2,981,703 | 4/1961 | Hoenel | 260—20 |
| 2,981,710 | 4/1961 | Hoenel | 260—29.3 |
| 3,464,946 | 9/1969 | Downing | 260—29.4 |

OTHER REFERENCES

Werthein, E.: "Textbook of Organic Chemistry" (pp. 249 to 251).

HOSEA E. TAYLOR, Primary Examiner

W. E. PARKER, Assistant Examiner

U.S. Cl. X.R.

260—29.3, 29.4, 842, 856